(12) United States Patent
Suddreth

(10) Patent No.: US 11,749,119 B2
(45) Date of Patent: Sep. 5, 2023

(54) METHODS AND SYSTEMS FOR GENERATING AND DISPLAYING A TIME AND A LOCATION FOR TRANSITIONS OF A VEHICLE

(71) Applicant: Honeywell International Inc., Charlotte, NC (US)

(72) Inventor: John Suddreth, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 182 days.

(21) Appl. No.: 17/226,147

(22) Filed: Apr. 9, 2021

(65) Prior Publication Data

US 2022/0327938 A1    Oct. 13, 2022

(51) Int. Cl.
*G08G 5/00*    (2006.01)

(52) U.S. Cl.
CPC ........... *G08G 5/0021* (2013.01); *G08G 5/006* (2013.01); *G08G 5/0034* (2013.01); *G08G 5/0091* (2013.01)

(58) Field of Classification Search
CPC .... G08G 5/0021; G08G 5/0034; G08G 5/006; G08G 5/0091; G08G 5/0052; G01C 23/00
See application file for complete search history.

(56) References Cited

U.S. PATENT DOCUMENTS

| 10,710,740 B1* | 7/2020 | Tchon | G01C 23/00 |
| 2019/0033853 A1* | 1/2019 | O'Laughlin | G08G 5/0021 |
| 2022/0057214 A1* | 2/2022 | O'Dell | G08G 5/0039 |

OTHER PUBLICATIONS (Roth, Allen J. "Sonic Boom: A Definition and Some Legal Implications." J. Air L. & Com. 25 (1958): 68) (Year: 1958).*

* cited by examiner

*Primary Examiner* — Shon G Foley
(74) *Attorney, Agent, or Firm* — Bookoff McAndrews, PLLC

(57) ABSTRACT

A method is disclosed for generating and displaying a location, time, amount of one or more transitions along a flight path of a vehicle to ensure sonic boom values remain within permissible threshold values. The method may include receiving speed data, altitude data, and flight path data, including environment data, for a flight path of the vehicle, and generating, for each of one or more transitions along the flight path of the vehicle, at least one of a transition location, of upcoming locations along the flight path, a transition time, and a transition amount, based on the received speed data, altitude data, and flight path data, and a permissible threshold boom value of the upcoming transitions along the flight path. The method may also include outputting the generated transition location, transition time, and transition amount for the one or more transitions to a display system.

20 Claims, 7 Drawing Sheets

METHODS AND SYSTEMS FOR GENERATING AND DISPLAYING A TIME AND A LOCATION FOR TRANSITIONS OF A VEHICLE

TECHNICAL FIELD

Various embodiments of the present disclosure relate generally to methods and systems for generating and displaying locations, times, and an amount of acceleration or deceleration, for transitions of a vehicle in supersonic flight.

BACKGROUND

Supersonic vehicles, for example, supersonic aircraft, generate a sonic boom when traveling faster than the speed of sound. Factors that influence a strength of a sonic boom include the weight, size, and shape of the vehicle, in addition to the altitude, speed and flight path of the vehicle, as well as weather and atmospheric conditions. For example, the higher the altitude of the vehicle, the greater the distance the shock waves must travel to reach the ground, which, in turn, reduces an intensity of the sonic boom. The sonic boom forms a boom "carpet" on the ground having a maximum intensity directly beneath the vehicle, and decreasing as a lateral distance from the flight path increases. Lateral spread of the sonic boom depends upon the altitude and speed of the aircraft, as well as the atmosphere. Maneuvers, such as pushovers, acceleration, deceleration, or "S" turns, of the vehicle may amplify the intensity of the sonic boom. In addition, geographic features of the ground, such as hills, valleys, and mountains, can reflect shock waves of the sonic boom, which may increase the intensity of the sonic boom.

The shock waves from the sonic booms can cause damage, such as compromised structural stability and shattered glass, to structures that lie within the boom carpet, and also generate noise disturbances in areas within the boom carpet. Therefore, certification authorities, such as the United States Federal Aviation Administration (FAA), prohibit or restrict operation of a civil aircraft at a true flight Mach number greater than 1 over land in the United States, and from a certain distance off shore, when a sonic boom could reach U.S. shores. As the FAA considers a range of permissible supersonic operations, however, there is a need to consider how to account for restrictions relating to permissible sonic boom values during operation of the vehicle.

For example, systems and/or operators of supersonic vehicles may need to adjust flight plans to accommodate restrictions, such as minimum, or floor, requirements that dictate a minimum altitude that a vehicle may cruise at supersonic speed, or maximum Mach speed requirements (based on altitude) for a geographic region through which the vehicle is to travel. More specifically, timings and locations for maneuvers, such as climbs, descents, accelerations, or decelerations, may require adjustment to minimize sonic booms generated by these maneuvers to ensure a speed of the vehicle does not exceed maximum Mach speed requirements. There is a need to quickly and efficiently determine timings and locations for maneuvers, including climbs, descents, accelerations, and decelerations, to ensure a speed of the vehicle complies with such restrictions pertaining to sonic booms, and to quickly and efficiently provide this information to an operator of the vehicle.

The present disclosure is directed to addressing one or more of these above-referenced needs.

SUMMARY OF THE DISCLOSURE

According to certain aspects of the disclosure, methods, as well as related systems and computer-readable storage media, are disclosed for generating and displaying a location, time, and amount for one or more transitions along a flight path of a vehicle to an operator of the vehicle during flight to ensure boom values for the transitions do not exceed permissible threshold boom values.

For instance, a method of generating and displaying an acceleration or deceleration location and an acceleration or deceleration amount may include receiving speed data, altitude data, and flight path data, including environment data, for a flight path of the vehicle, and generating, for each of one or more transitions along the flight path of the vehicle, at least one of a transition location, of upcoming locations along the flight path, a transition time, and a transition amount, based on the received speed data, altitude data, and flight path data, and a permissible threshold boom value of the upcoming transitions along the flight path. In addition, the method may include outputting the generated transition location, transition time, and transition amount for the one or more transitions to a display system.

A system for generating and displaying a location, a time, and an amount of one or more transitions along a flight path of a vehicle, may include a memory storing instructions, and a processor executing the instructions to perform a method. The method may include receiving speed data, altitude data, and flight path data, including environment data, for a flight path of the vehicle, and generating, for each of one or more transitions along the flight path of the vehicle, at least one of a transition location, of upcoming locations along the flight path, a transition time, and a transition amount, based on the received speed data, altitude data, and flight path data, and a permissible threshold boom value of the upcoming transitions along the flight path. The method may also include outputting the generated transition location, transition time, and transition amount for the one or more transitions to a display system.

A non-transitory computer-readable medium may store instructions that, when executed by a processor, cause the processor to perform a method of generating and displaying a location, a time, and an amount of one or more transitions along a flight path of a vehicle. The method may include receiving speed data, altitude data, and flight path data, including environment data, for a flight path of the vehicle, and generating, for each of one or more transitions along the flight path of the vehicle, at least one of a transition location, of upcoming locations along the flight path, a transition time, and a transition amount, based on the received speed data, altitude data, and flight path data, and a permissible threshold boom value of the upcoming transitions along the flight path. The method may also include outputting the generated transition location, transition time, and transition amount for the one or more transitions to a display system.

Additional objects and advantages of the disclosed embodiments will be set forth in part in the description that follows, and, in part, will be apparent from the description, or may be learned by practice of the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

In general, the present disclosure is directed to methods, and related systems and computer-readable storage media, for generating and displaying a location, a time, and an amount of one or more transitions along a flight path of a vehicle during supersonic flight of the vehicle. In addition or alternatively, the methods relate to using the generated location, time, and amount of the one or more transitions in updating a flight plan for the vehicle. For instance, a method of the present disclosure may include receiving speed data, altitude data, and flight path data for a flight path of the vehicle, and generating, for each of one or more transitions along the flight path of the vehicle, at least one of a transition location, of upcoming locations along the flight path, a transition time, and a transition amount, based on the received speed data, altitude data, and flight path data, and a permissible threshold boom value of the upcoming transitions along the flight path. Generation of the transition location, the transition time, and the transition amount may be based on the environment data and based on a permissible threshold boom value for each location of the upcoming locations along the flight path. The method may also include outputting the generated transition location, transition time, and transition amount for the one or more transitions to a display. In addition or alternatively to outputting the generated transition location, transition time, and transition amount for the one or more transitions, the method may also include using the generated transition location, transition time, and transition amount for the one or more transitions to update a flight plan of the vehicle.

By virtue of the methods, and the related systems and computer-readable storage media, disclosed herein, information can be quickly and efficiently generated and displayed to an operator of a vehicle, or used to update a flight plan of a vehicle, to ensure the vehicle, and, in particular, transitions made by the vehicle do not generate sonic booms that exceed permissible threshold boom values for locations along a flight path.

Figure 1:
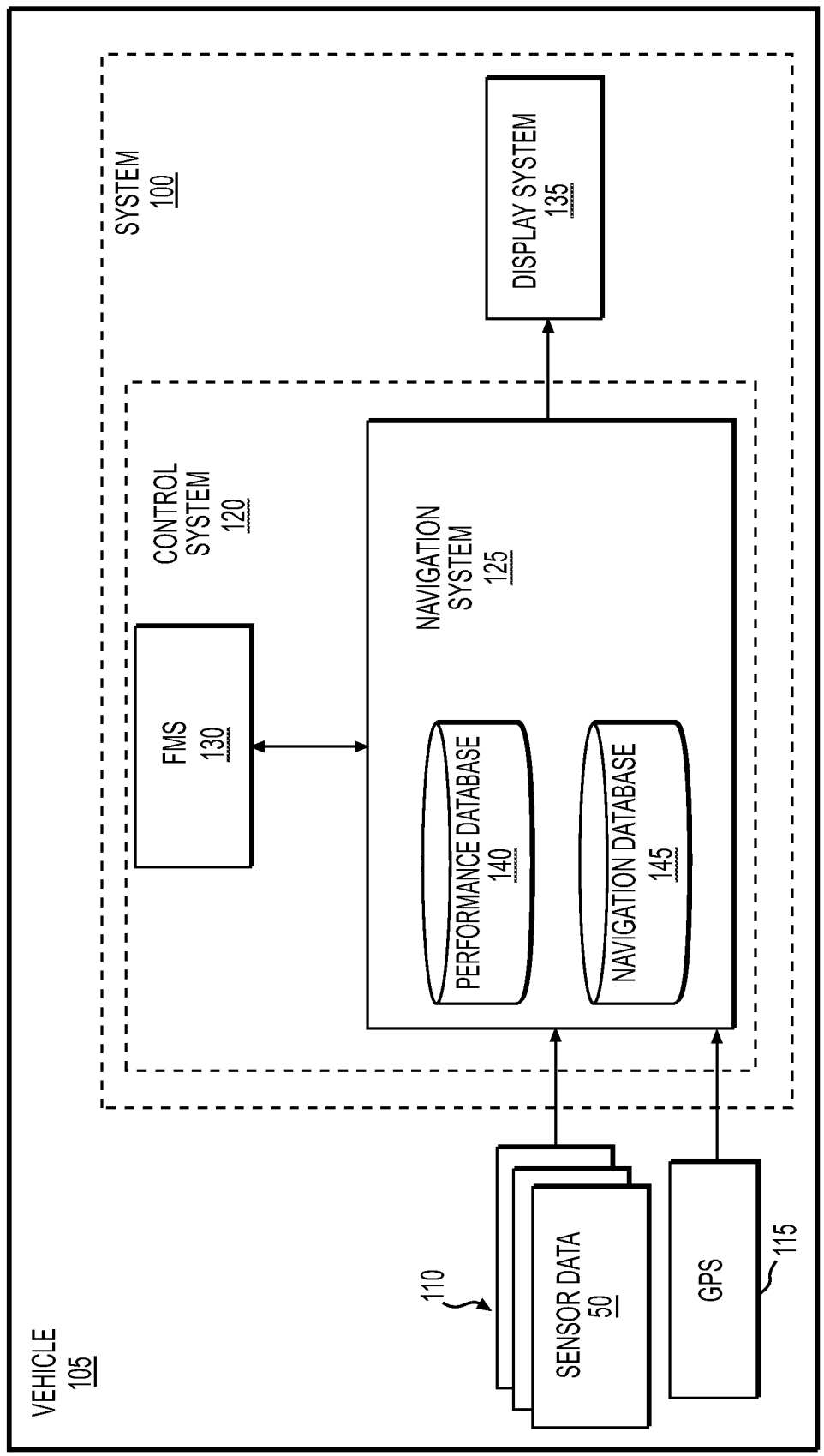
FIG. 1 depicts an exemplary block diagram of a system for generating and displaying a location, a time, and an amount of one or more transitions along a flight path of a vehicle, according to one or more embodiments.

FIG. 1 depicts an exemplary block diagram of a system 100 for generating a location, a time, and an amount of one or more transitions and outputting the generated location, time, and amount of the one or more transitions to a display of a vehicle, according to one or more embodiments. The system 100 is shown as being installed within a vehicle 105, which may be a supersonic aircraft, although the vehicle 105 is not so limited, and may also be a supersonic drone (e.g., an unmanned aircraft), a rocket, a spacecraft, or any other vehicle capable of traveling at supersonic speed. The vehicle 105 may also be equipped with one or more sensors 110, including, for example, a speed sensor and an altitude sensor, described in more detail below. The vehicle 105 may also include a Global Positioning System (GPS) antenna 115. The system 100 includes a control system 120, which comprises a navigation system 125 and a flight management system (FMS) 130, and a display system 135 (or, generally, a user interface system). The system 100 may be housed within the vehicle 105, as shown in FIG. 1, and, more specifically, may be installed within a cockpit of the vehicle 105, for example. Portions of the system 100, such as the FMS 130 and/or portions of the navigation system 125, may, however, be located outside of the vehicle 105.

The FMS 130 may store a flight plan 200, including a planned flight path 205 (shown in FIGS. 2-4), of the vehicle 105, and may manage the flight plan of the vehicle 105 based on inputs, such as user or system inputs, such as inputs from the sensors 110 and inputs from the GPS 115, to thereby control the vehicle 105 as it progresses along the flight plan. The FMS 130 may continuously perform calculations along the planned flight path 205, as the vehicle 105 proceeds along or near to the planned flight path 205. In performing these calculations, the FMS 130 may account for a required time of arrival (RTA) of the vehicle 105 to a destination, restricted airspace, weather or atmospheric conditions, air traffic from other aircraft, limitations to ensure passenger comfort, etc. And, with respect to some of the data accounted for by the FMS 130, the FMS 130 may continually (e.g., periodically) update the planned flight path 205 based on this data, such as data relating to weather or atmospheric conditions. The FMS 130 may also update the planned flight path 205 based on changes in data, e.g., changes in the weather or atmospheric conditions, during a flight. In addition, the FMS 130 may use performance data of the vehicle, described in more detail below, to determine locations, times, and amounts for transitions, such as acceleration or deceleration, along the planned flight path 205. And, the FMS 130, as part of the control system 120, may control the vehicle 105 as it proceeds along the planned flight path 205.

Figure 2:
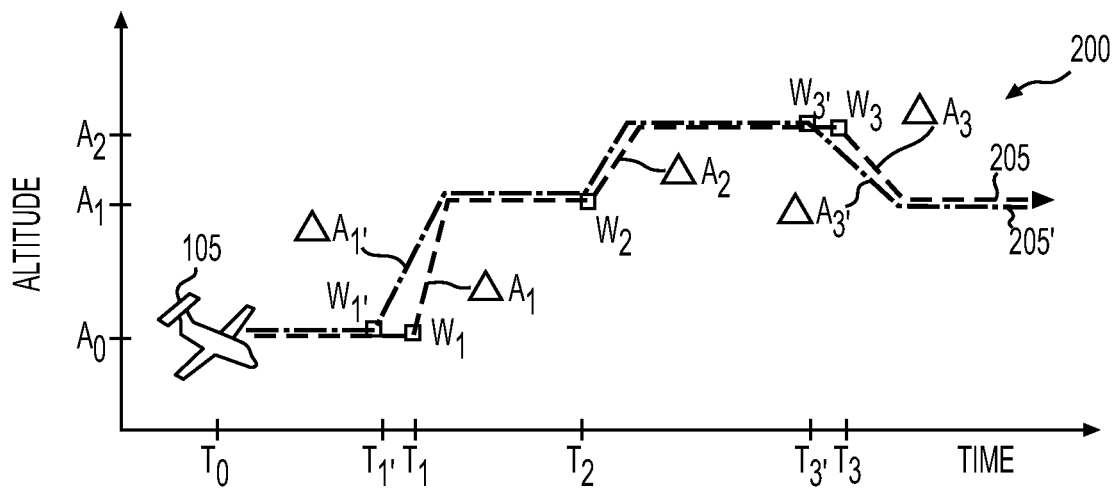
FIG. 2 depicts a graph of time against altitude for an exemplary planned flight path, according to one or more embodiments.
Figure 3:
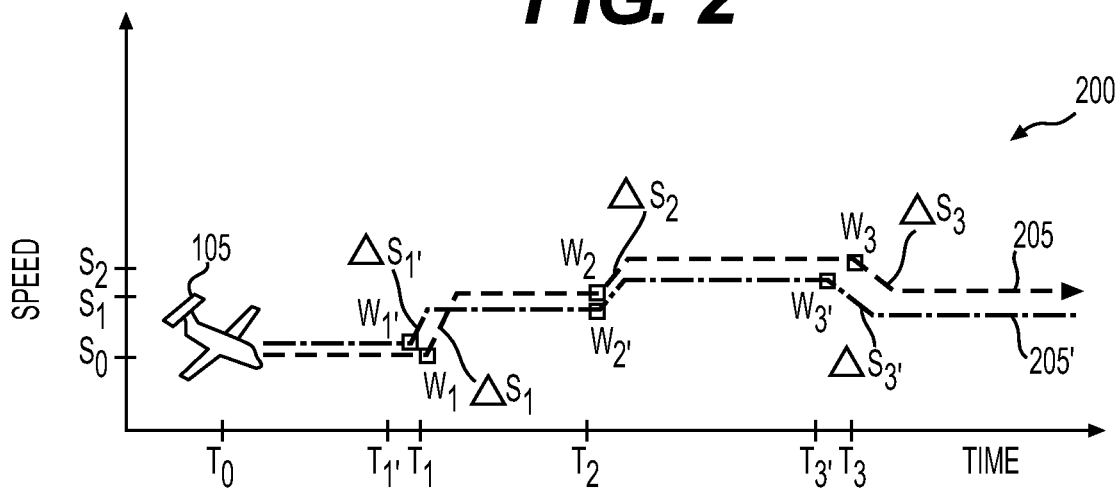
FIG. 3 depicts a graph of time against speed for an exemplary planned flight path, according to one or more embodiments.

As depicted in FIG. 2, for example, the flight plan 200 may include altitudes for the planned flight path 205 between various locations (e.g., waypoints, such as waypoints $W_1$ to $W_3$, at times $T_1$ to $T_3$, respectively, shown in FIG. 2). As shown in FIG. 2, the flight plan 200 may indicate that at waypoints $W_1$ and $W_2$, the vehicle 105 is to change altitude by climbing (or ascending), and at waypoint $W_3$, the vehicle 105 is to change altitude by descending. Climbing and descending are examples of transitions, with waypoints $W_1$, $W_2$, and $W_3$ being referred to herein as "transition locations." Notably, however, the flight plan 200 may indicate a transition at a different point, other than a named waypoint, such as before or after one of waypoints $W_1$, $W_2$, or $W_3$. As depicted in FIG. 3, the flight plan 200 may also include speeds for the planned flight path 205 between various waypoints (e.g., waypoints, such as waypoints $W_1$ to $W_3$, at times $T_1$ to $T_3$, respectively, shown in FIG. 3). The flight plan 200 may also indicate that at waypoints $W_1$ and $W_2$, the vehicle 105 is to change speed by accelerating, and at waypoint $W_3$, the vehicle 105 is to change speed by decelerating, for example. Accelerating and decelerating are examples of transitions, with waypoints $W_1$, $W_2$, and $W_3$ being referenced to herein as "transition locations," and the change in speed and the change in altitude being "transition amounts." A transition amount may comprise a change in speed $\Delta S$, a change in altitude $\Delta A$, or both. The transitions may result in transition of the vehicle 105 from supersonic to subsonic flight, or vice versa. Flight plans may indicate transitions based on various criteria, such as RTA, restricted airspace, air traffic from other aircraft, efficient use of fuel, weather conditions, etc. Furthermore, the flight plan 200 may be updated before and/or during a flight of the vehicle 105, such as by an operator, e.g., a pilot, or based on user or system inputs to the FMS 130.

The navigation system 125 includes a performance database 140 that stores performance data of the vehicle 105, described in more detail below, and a navigation database 145 that stores the flight plan 200. The navigation system 125 may control navigation of the vehicle 105, based at least in part on the flight plan 200 and calculations performed by the FMS 130, to control the vehicle 105 along the flight path 200, including along maneuvers and through transition points. Examples of maneuvers include climbs, descents, accelerations, decelerations, which are described above as transitions, as well as turns, including, for example, banked turns or "s" turns. A plurality of maneuvers may be programmed into the FMS 130 or the navigation system 125, and stored, for example, in the navigation database 145. The plurality of maneuvers may be designed based on circumstances (e.g., starting altitude, cruising altitude, ending altitude, geographic conditions, weather conditions, etc.) for the route through which the vehicle 105 is to travel, and may further be designed based on specific characteristics of the vehicle 105 (e.g., characteristics of all vehicles of a type similar or same as the vehicle 105, including center of gravity (CG), weight, etc.). The plurality of maneuvers may be included as part of the flight plan 200 (e.g., takeoff, climb, cruise, turns, accelerate, decelerate, descend, landing, etc.). Generally, the plurality of maneuvers may be flight path curves that indicate an altitude and/or a speed, with respect to time, and one or more waypoints of the vehicle 105 through a maneuver. The plurality of maneuvers may be stored in the performance database 140, e.g., with identifiers.

The navigation system 125, in conjunction with the FMS 130, controls actuation systems of the vehicle 105, which may include motors, engines, and/or propellers to generate thrust, lift, and/or directional force for the vehicle 105, and flaps or other control surfaces to augment the thrust, lift, and/or directional force for the vehicle 105, to carry out the plurality of maneuvers of the flight plan 200. The navigation system 125 may collect sensor data 50 from various sensors 110 installed on the vehicle 105, GPS data from the GPS 115, and navigation and performance-related data from external systems connected to the navigation system 125 via a wired and/or a wireless connection. The received data may be stored in one or more databases of the navigation system 125, such as the performance database 140 and the navigation database 145, depending on the type of data. For example, in a case in which the vehicle 105 is an aircraft, aerodynamic and engine performance models of the aircraft, maximum take-off weight, fuel weight, and distribution models, CG models and CG thresholds, drag models, and other data relating to the particular aircraft may be stored in the performance database 140. The aerodynamic and engine performance models may include a flight envelope for maneuvers of the vehicle 105, and a prediction model, discussed in detail below. The information stored in the performance database 140 may be used to predict performance of the vehicle in a maneuver, such as the automated descent maneuver or the automated deceleration maneuver noted above, and, more specifically, to predict a boom value that will be generated when the vehicle 105 performs such a maneuver.

The navigation database 145 may store information related to navigation or routing of the vehicle 105 in a geographic area. In particular, the navigation database 145 may contain data elements that indicate restrictions on maneuvers, such as supersonic flight restrictions. The supersonic flight restrictions may indicate three-dimensional zones in which supersonic flight is not allowed, or is allowed but in a limited manner. More specifically, the supersonic flight restrictions may include permissible threshold boom values for waypoints along the planned flight path 205, as well as for locations near the waypoints of the planned flight path 205. The permissible threshold boom values indicate, for example, maximum boom values for particular waypoints. The information stored in the navigation database 145 may also include, for example, the waypoints, airports, runways, airways, radio navigation aids, holding patterns, etc.

Figure 4:
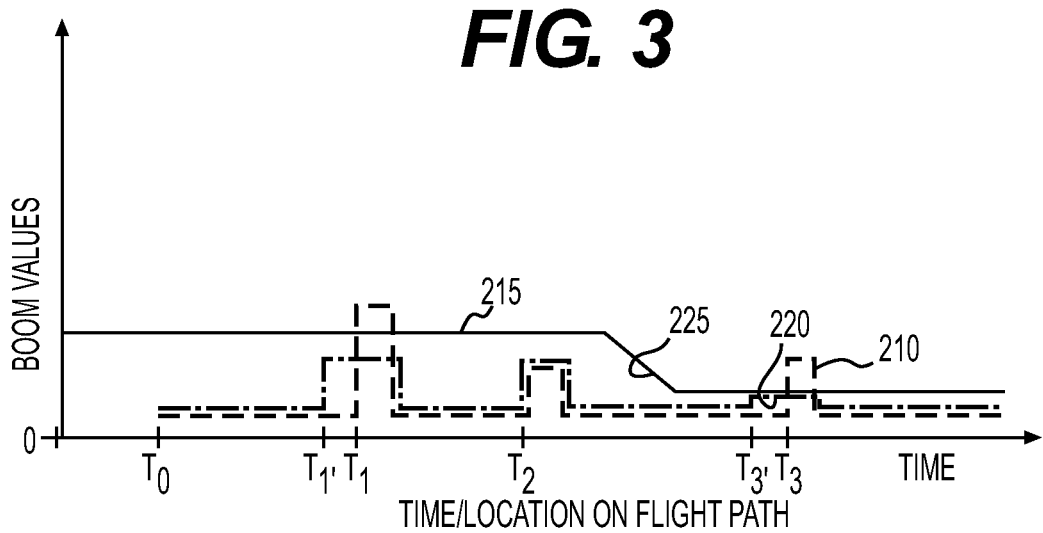
FIG. 4 depicts a graph of times and locations along a flight path against boom values, including determined or predicted boom values, adjusted boom values, and permissible boom values, according to one or more embodiments.

FIG. 4 shows a graph of times and locations along a flight path 200 against boom values, including predicted boom values 210, permissible boom values 215, and adjusted boom values 220, along the planned flight path 205. The predicted boom values 210 represent boom values determined based on data relating to the flight plan 200 (e.g., starting altitude, cruising altitude, ending altitude), data relating to the route through which the vehicle 105 is to travel (e.g., geographic conditions, environment conditions, etc.), and data relating to characteristics of the vehicle 105 (e.g., characteristics of all vehicles of a type similar or same as the vehicle 105, including center of gravity (CG), weight, etc.). The predicted boom values 210 may be generated as part of the flight plan 200. The permissible boom values 215 represent boom values set by a certification authority, such as the FAA, and may be based on altitudes, speeds, geography, and environment data for locations along the flight path 205. Changes in the permissible boom values 215, such as the change 225 shown in FIG. 4, may be based on a change in geography of land below the flight path 205, a change in environment data, or a change in the flight path 205, such as a change in altitude, speed, and/or waypoint in the flight path 205. The adjusted boom values 220 represent boom values determined based on the method 600, described below, and may, for example, reflect changes in locations, times, and amounts for transitions of the vehicle to ensure boom values from such transitions do not exceed permissible boom values.

Figure 5:
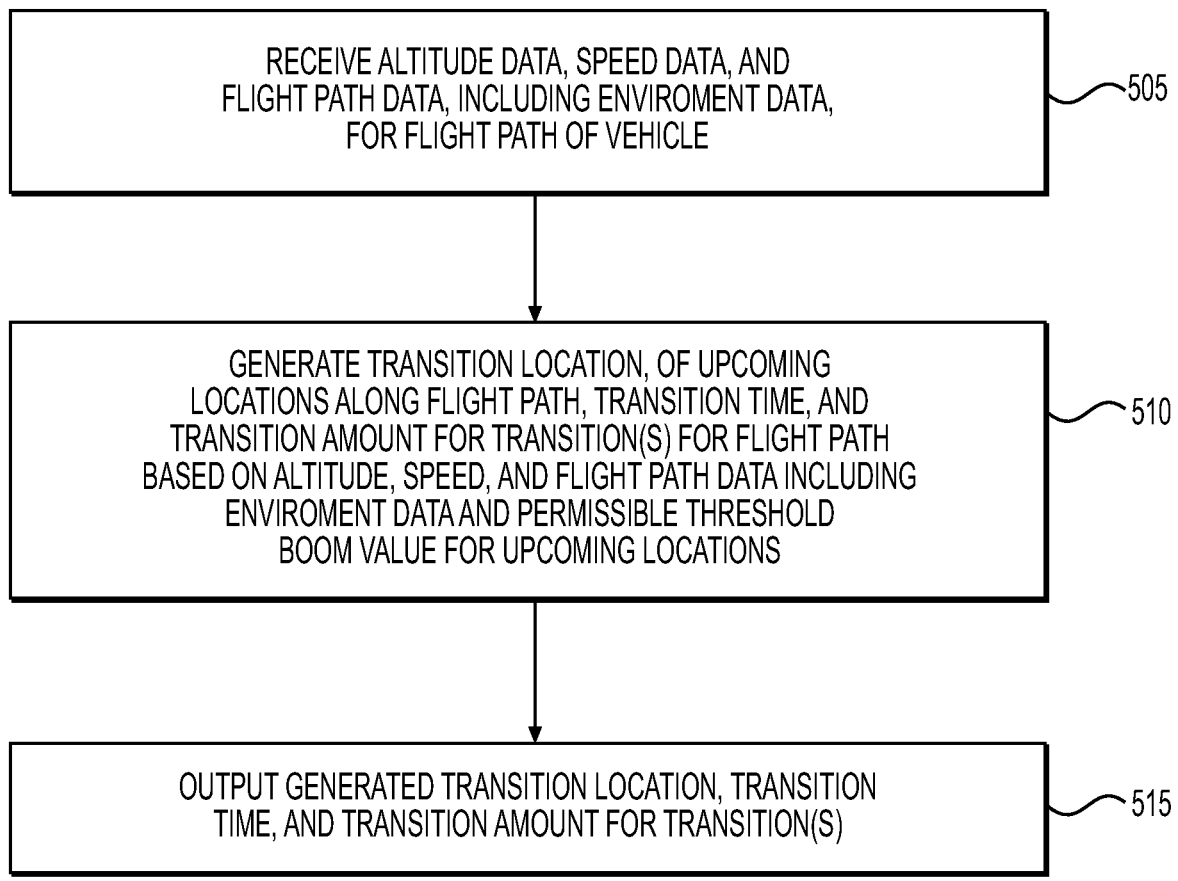
FIG. 5 is a flowchart for generating and outputting a location, time, and amount of one or more transitions based on a permissible boom value, according to one or more embodiments.

With reference to FIG. 5, in one aspect of the disclosure, the system 100, and, in particular, the control system 120 may perform a process 500 of generating and displaying a location, a time, and an amount of one or more transitions along a flight path of a vehicle, and outputting the location, time, and amount of the one or more transitions to an operator of the vehicle 105 via a display of the display system 135, and, alternatively or in addition to outputting these values, using the generated location, time, and amount of the one or more transitions to update the flight plan 200 using the control system 120. The process 500 may include receiving altitude data, speed data, and flight path data, including environment data, for a flight path of the vehicle 105 in step 505. Then, in step 510, the process 500 includes generating, for each of one or more transitions along the flight path 205 of the vehicle 105, a transition location, of upcoming locations along the flight path 205, a transition time, and a transition amount, based on at least the received altitude data, speed data, and flight data including the environment data, and a permissible threshold boom value associated with each of the upcoming locations along the flight path 205. Then, in step 515, the process 500 includes outputting the generated transition location, transition time, and transition amount, for each of the one or more transitions, to the operator via a display of the display system 135. Alternatively, or in addition, the process 500 may include using the generated transition location, transition time, and transition amount to update the planned flight path 205 of the vehicle 105.

To obtain the altitude data and speed data, the control system 120 may continually or periodically request and receive the sensor data 50 from the one or more sensors 110, which are connected to other systems of the vehicle 105. For instance, the control system 120 may receive speed data from a speed sensor, and altitude data from an altitude sensor.

To obtain flight path data for a flight path of the vehicle 105, the control system 120 may request a copy of the flight plan 200, or at least a portion thereof, from the FMS 130. The flight path data includes, for example, altitudes and speeds for a plurality of waypoints along the planned flight path 205, as well as locations and amounts for one or more transitions along the planned flight path 205. In the process 500 described above, the control system 120 may request an altitude, a speed, a location, and a transition amount for a transition location, for example, along the planned flight path 205. In addition, the control system 120 may receive updates to the flight plan 200 from the FMS 130 during the flight.

The control system 120 also obtains environment data, as part of the flight path data, as sensor data 50 from the one or more sensors 110, such as a temperature sensor, a barometric pressure sensor, etc. In addition or alternatively, the control system 120 may obtain the environment data from the FMS 130, which, in turn, may obtain the environment data from other aircraft that has passed through or near locations of the planned flight path 205.

The control system 120 may also monitor progress of the vehicle 105 through the flight plan 200, by extracting position data (e.g., GPS data, heading data, track data, etc.) from the sensor data 50 and from the GPS antenna 115, and comparing the position data to points of the planned flight path 205. For instance, the control system 120 may determine the position data indicates the vehicle 105 is a distance away (or time away) from a next waypoint, such as a transition location, on the planned flight path 205.

In performing processing of received altitude data, speed data, and flight path data to generate a transition location, a transition time, and a transition amount for one or more transitions during the process 500, the control system 120 executes an algorithm, which may be stored in a memory of the control system 120, shown in FIG. 9, and described below. The algorithm may include performance calculations used to determine performance characteristics, such as determining a thrust-to-weight ratio, a drag force, a timing or duration of the flight based on data relating to the vehicle 105 and the environment data, such as barometric pressure, air temperature, air density, etc. The algorithm also includes a sonic boom algorithm, which calculates a boom value for a given transition along the planned flight path 205 using performance tables for the vehicle 105. The performance tables are stored in the performance database 140. The sonic boom algorithm uses the received speed data and altitude data, the flight path data, including data relating to transitions along the flight path 205, performance tables for the vehicle 105, stored in the performance database 140, and performance measurements of the vehicle 105, in calculating the boom value for the transition.

The control system 120 then compares the calculated boom value to a permissible threshold boom value for the transition. If the calculated boom value is less than or equal to the permissible threshold boom value, for example, the control system 120 proceeds with setting a transition location, a transition time, and a transition amount for the transition, based on the transition location, the transition time, and the transition amount included in the flight path data. The control system 120 may execute the sonic boom algorithm for more than one transition along the planned flight path 205, to ensure the vehicle 105, in performing a transition, such as a climb, descent, acceleration, or deceleration, does not generate a sonic boom that exceeds permissible threshold boom values.

Figure 8:
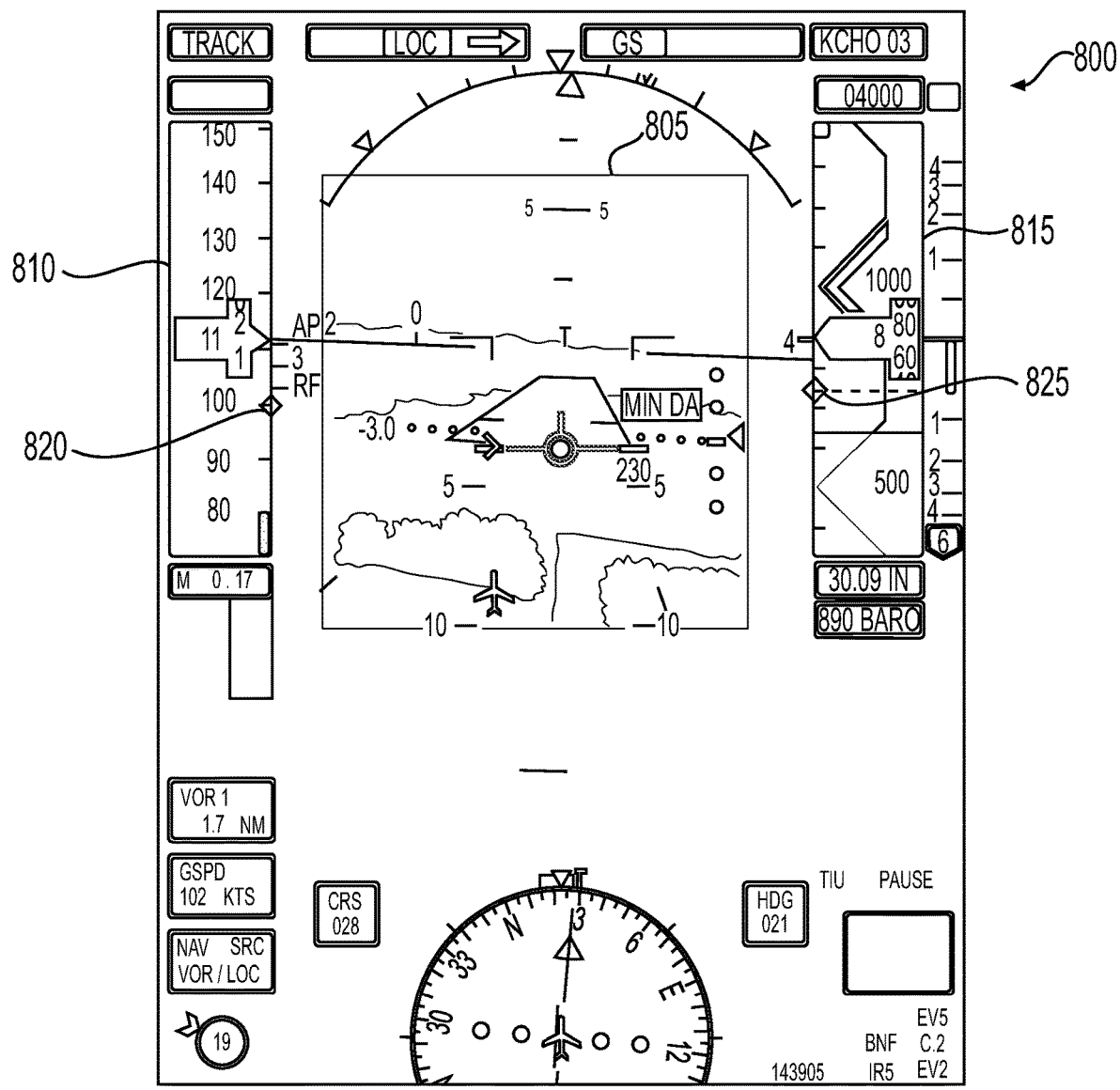
FIG. 8 depicts an example display of the generated location, time, and amount for a transition, as viewed by an operator of a vehicle, according to one or more embodiments.

To output the generated transition location, the transition time, and the transition amount, the control system 120 electronically transmits the transition location, the transition time, and the transition amount to the display system 135, which causes a display, shown in FIG. 8, for example, to display these values to the operator of the vehicle 105. For example, the control system 120 may output to a display 800, shown in FIG. 8, a transition location and a transition time to be displayed to the operator of the vehicle 105. The control system 120 may also output the transition amount, in the form of a change in altitude, a change in speed, or both, to be displayed alongside an altitude tape and an airspeed tape, respectively, as discussed in more detail below. By virtue of this arrangement, an operator of the vehicle 105 is made aware of a transition location, a transition time, and a transition amount even in a case in which the FMS 130, as part of the control system 120, automatically controls the vehicle through the transition. Additionally or alternatively, the control system 120 may also use these values in controlling the vehicle through a transition along the planned flight path 205. By virtue of this control, the vehicle 105 proceeds along the planned flight path 205 through the transition at the location, the time, and by the amount for which a boom value is permissible.

For example, with reference to FIGS. 2-4, the control system 120 may receive the altitude data, including the altitudes $A_0$, $A_1$, and $A_2$, and corresponding times, along the planned flight path 205 shown in FIG. 2. The control system 120 may also receive the speed data, including the speeds $S_0$, $S_1$, and $S_2$, and corresponding times, along the planned flight path 205. The control system 120 may also receive environment data, such as a barometric pressure, for locations along the planned flight path 205. The control system 120 then generates the transition location W, transition time T, and transition amount, such as a change in altitude $\Delta A$ and/or a change in speed $\Delta S$. In FIGS. 2-4, for example, the control system 120 may generate transition location $W_1$ at transition time $T_1$, including a change in altitude $\Delta A_1$ and a change in speed $\Delta S_1$. This transition reflects a climb, including an acceleration. The control system 120 may also generate transition location $W_2$ at transition time $T_2$, including a change in altitude $\Delta A_2$ and a change in speed $\Delta S_2$. This transition also reflects a climb, including an acceleration. In addition, the control system 120 may generate transition location $W_3$ at transition time $T_3$, including a change in altitude $\Delta A_3$ and a change in speed $\Delta S_3$. This transition reflects a descent and a deceleration. The control system 120 may, for example, determine one or more boom values for each transition, and, as described in more detail below, output the generated transition locations, transition times, and transition amounts to the display and/or use these values in controlling the vehicle 105 as it progresses along the flight path 205.

Figure 6:
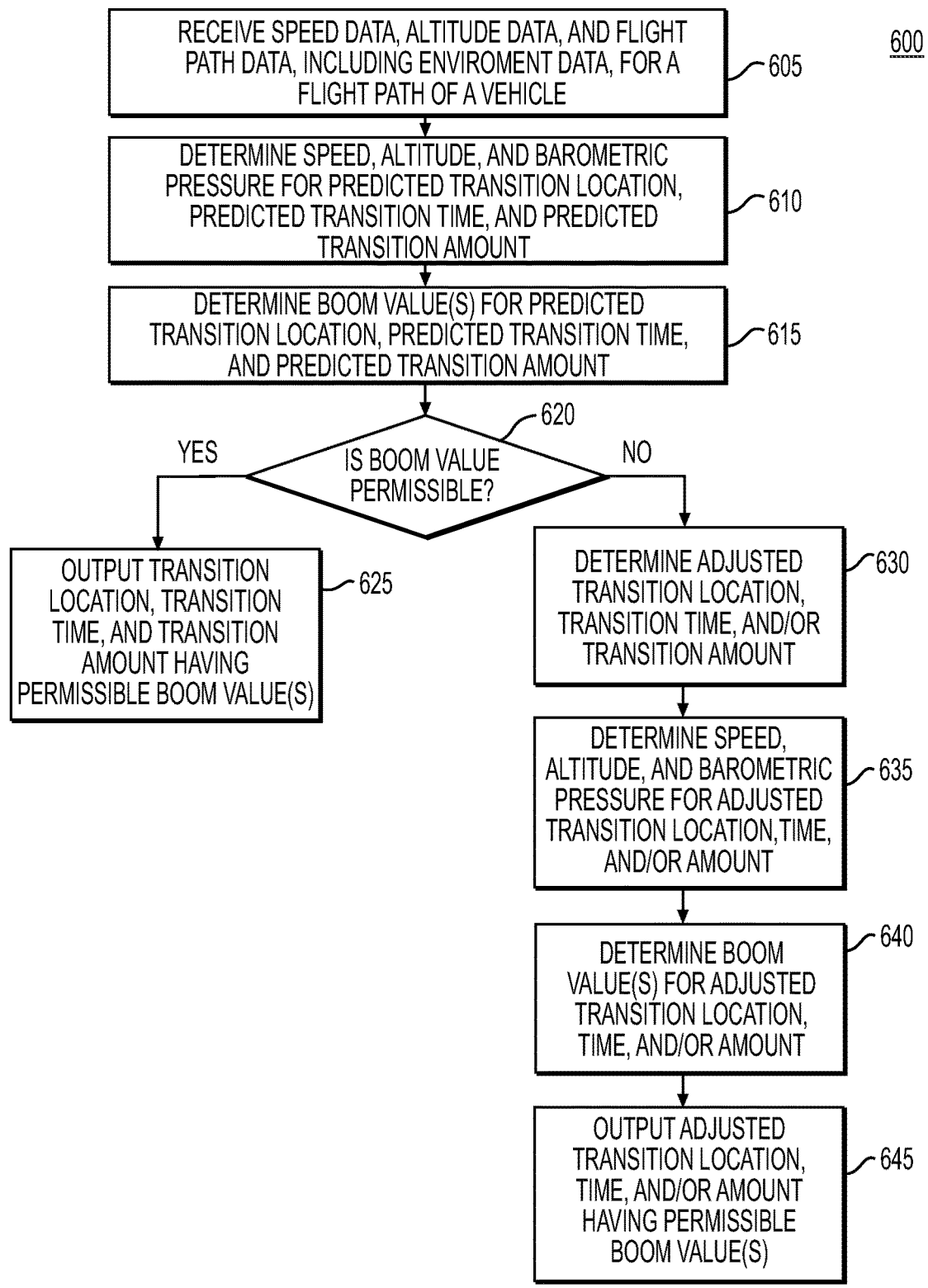
FIG. 6 depicts a flowchart for generating and outputting an adjusted location, time, and amount of one or more transitions, according to one or more embodiments.

With reference to FIG. 6, in another aspect of the disclosure, the system 100, and, in particular, the control system 120 may perform a process 600 of generating an adjusted transition location, an adjusted transition time, and/or an adjusted transition amount, as the transition location, the transition time, and the transition amount, respectively, to an operator of the vehicle 105, based on a determination of whether the boom value is permissible. The process 600 may include the control system 120 receiving altitude data, speed data, and flight path data for a planned flight path 205 of the vehicle 105 in step 605. Then, the control system 120 determines a speed, an altitude, and a barometric pressure for a predicted transition location, a predicted transition time, and a predicted transition amount, based on the flight path data in step 610. In step 615, the control system 120 determines one or more boom values for the predicted transition location, the predicted transition time, and the predicted transition amount, based on the speed, the altitude, and the barometric pressure determined in step 610. A single boom value may be determined corresponding to the predicted transition location, the predicted transition time, and the predicted transition amount, or more than one boom value may be determined for locations along a boom carpet that will be generated by the vehicle 105. In step 620, the control system 120 determines whether the determined one or more boom values are permissible by, for example, comparing the determined boom values to permissible threshold boom values for the corresponding locations. Each of the determined boom values may be permissible if it is less than or equal to the corresponding permissible threshold boom value.

If the control system 120 determines that the boom value is permissible (YES in step 620), in step 625, the control system 120 outputs the predicted transition location, the predicted transition time, and the predicted transition amount having the permissible boom value to the display and/or uses these values in controlling the vehicle 105 as it proceeds along the planned flight path 205. In particular, as noted above with respect to the method 500, for example, the control system 120 may output to the display 800, shown in FIG. 8, a transition location and a transition time to be displayed to the operator of the vehicle 105. The control system 120 may also output the transition amount, in the form of a change in altitude, a change in speed, or both, to be displayed alongside an altitude tape and an airspeed tape, respectively, as discussed in more detail below. By virtue of this arrangement, an operator of the vehicle 105 is made aware of a transition location, a transition time, and a transition amount even in a case in which the FMS 130, as part of the control system 120, automatically controls the vehicle through the transition.

If, on the other hand, the control system 120 determines that the boom value is not permissible (NO in step 620), in step 630, the control system 130 determines at least one of an adjusted transition location, an adjusted transition time, and an adjusted transition amount for which a boom value would be permissible, that is, for which the boom value will be less than or equal to the corresponding permissible threshold boom value. In step 635, the controller 120 determines a speed, an altitude, and a barometric pressure for the adjusted transition location, the adjusted transition time, and the adjusted transition amount. Then, in step 640, the controller 120 determines one or more boom values for the adjusted transition location, the adjusted transition time, and the adjusted transition amount, based on the speed, the altitude, and the barometric pressure determined in step 635. A single boom value may be determined corresponding to the adjusted transition location, the adjusted transition time, and the adjusted transition amount, or more than one boom value may be determined for locations along a boom carpet that will be generated by the vehicle 105. Then, the method 600 proceeds to step 645, in which the control system 120 outputs the adjusted transition location, the adjusted transition time, and the adjusted transition amount having the permissible boom value to the display and/or uses these values in controlling the vehicle 105 as it proceeds along the planned flight path 205.

As with the process 500, the control system 120 may continually or periodically request and receive the sensor data 50 from the one or more sensors 110, which are connected to other systems of the vehicle 105, to obtain at least the altitude data and speed data. For instance, the control system 120 may receive speed data from a speed sensor, altitude data from an altitude sensor, and the barometric pressure from a pressure sensor. Also, the control system 120 may request a copy of the flight plan 200, or at least a portion thereof, from the FMS 130, to obtain flight path data for a flight path of the vehicle 105. The flight path data includes, for example, altitudes and speeds for a plurality of waypoints along the planned flight path 205. In the process 600 described above, the control system 120 may request an altitude and a speed for one or more particular waypoints, such as waypoint for a predicted transition, along the planned flight path 205, to determine the altitude and the speed at the waypoint for the predicted transition. The control system 120 may also obtain a barometric pressure for the predicted transition location and altitude as part of the flight path data. The barometric pressure may be, for example, provided to the FMS 130 by another aircraft that has passed through or near the transition location at the altitude within a period of time, such as within 15 minutes. In addition, the control system 120 may receive updates to the flight plan 200 from the FMS 130 during the flight.

The control system 120 may also monitor progress of the vehicle 105 through the flight plan 200, by extracting position data (e.g., GPS data, heading data, track data, etc.) from the sensor data 50 and from the GPS antenna 115, and comparing the position data to points of the planned flight path 205. For instance, the control system 120 may determine that the position data indicates the vehicle 105 is a distance away (or time away) from a next waypoint on the planned flight path 205.

In determining one or more boom values for the transition, that is, for the predicted transition location, the predicted transition time, and the predicted transition amount, the control system 120 executes an algorithm, which may be stored in the memory of the control system 120, shown in FIG. 9, and described below. The algorithm may include performance calculations used to determine performance characteristics, such as determining a thrust-to-weight ratio, a drag force, a timing or duration of the flight based on data relating to the vehicle 105 and environmental data, such as air temperature, air density, etc., as well as the barometric pressure, noted above. The algorithm includes at least the sonic boom algorithm, which, as noted above, calculates one or more boom values for a given waypoint along the planned flight path 205 using, among other information, the performance tables for the vehicle 105, which are stored in the performance database 140. The sonic boom algorithm uses the determined altitude, speed, and barometric pressure for the predicted transition location, the performance tables for the vehicle 105, stored in the performance database 140, and performance measurements of the vehicle 105, in calculating the boom value for the transition. The control system 120 may calculate a plurality of boom values for the transition, corresponding to locations along the boom carpet that will be generated by the vehicle 105 in performing the transition. That is, for each transition along the planned flight path 205, more than one boom value may be calculated to ensure the vehicle 105 does not create a sonic boom that exceeds permissible threshold boom values at any of the locations along the boom carpet.

The control system 120 then compares the calculated one or more boom values to corresponding permissible threshold boom values for the location corresponding to the transition. If each calculated boom value is less than or equal to the corresponding permissible threshold boom value, for example, the control system 120 proceeds with outputting the predicted transition location, the predicted transition time, and the transition amount to the display and/or using these values in controlling the vehicle 105 along the planned flight path 205.

If the control system 120 determines that the boom values are not permissible, the control system 120 determines the adjusted transition location, the adjusted transition time, and the adjusted transition amount, for the transition, for which a boom value would be permissible. The control system 120 then determines a speed, an altitude, and a barometric pressure for the adjusted transition location, the adjusted transition time, and the adjusted transition amount, based on the speed data, and altitude data, and the flight path data, including the environment data.

For example, if the control system 120 determines that, for a transition consisting of a climb at waypoint $W_1$, shown in FIGS. 2 and 3, at time $T_1$, a predicted boom value will exceed a permissible threshold boom value, as shown in FIG. 4 at time the control system 120 may determine an adjusted transition location as $W_{1'}$, an adjusted transition time $T_{1'}$, and an adjusted transition amount, shown in FIGS. 2-4. The adjusted transition location $W_{1'}$ may, for example, be a location along the planned flight path 205 that is before the predicted transition location $W_1$, the adjusted transition time may be a time before the predicted transition time $T_1$, and the adjusted transition amount may be an adjusted change in speed, an adjusted change in altitude, or both, reflecting a change from the predicted transition amount, respectively. The control system 120 then determines the speed, the altitude, and the flight path data, including barometric pressure, for the adjusted transition location $W_{1'}$, the adjusted transition time $T_{1'}$, and the adjusted transition amount.

The control system 120 then uses the determined speed, altitude, and barometric pressure to calculate a boom value for the adjusted transition location, the adjusted transition time, and the adjusted transition amount. In determining one or more boom values, the control system 120 executes the algorithm, which may include performance calculations used to determine performance characteristics, such as determining a thrust-to-weight ratio, a drag force, a timing or duration of the flight based on data relating to the vehicle 105 and environmental data, such as air temperature, air density, etc., as well as the barometric pressure, as noted above. The algorithm includes at least the sonic boom algorithm, which, as noted above, calculates one or more boom values for a given waypoint along the planned flight path 205 using, among other information, the performance tables for the vehicle 105, which are stored in the performance database 140. The sonic boom algorithm uses the determined altitude, speed, and barometric pressure for the adjusted transition location, the adjusted transition time, and the adjusted transition amount, the performance tables for the vehicle 105, stored in the performance database 140, and performance measurements of the vehicle 105, in calculating the boom value for the transition. The control system 120 may calculate a plurality of boom values for the transition, corresponding to locations along the boom carpet that will be generated by the vehicle 105 in performing the transition. That is, for each transition along the planned flight path 205, more than one boom value may be calculated to ensure the vehicle 105 does not create a sonic boom that exceeds permissible threshold boom values at any of the locations along the boom carpet.

The control system 120 then compares the calculated one or more boom values to corresponding permissible threshold boom values for the adjusted transition location, the adjusted transition time, and the adjusted transition amount. If each calculated boom value is less than or equal to the corresponding permissible threshold boom value, for example, the control system 120 proceeds with outputting the adjusted transition location, the adjusted transition time, and the adjusted amount to the display and/or using these values in controlling the vehicle 105 along the planned flight path 205. In particular, as noted above with respect to the method 500, and as noted with respect to step 625, for example, the control system 120 may output to the display 800, shown in FIG. 8, the adjusted transition location and the adjusted transition time to be displayed to the operator of the vehicle 105. The control system 120 may also output the adjusted transition amount, in the form of an adjusted change in altitude, an adjusted change in speed, or both, to be displayed alongside an altitude tape and an airspeed tape, respectively, as discussed in more detail below. By virtue of this arrangement, an operator of the vehicle 105 is made aware of an adjusted transition location, an adjusted transition time, and an adjusted transition amount even in a case in which the FMS 130, as part of the control system 120, automatically controls the vehicle through the transition.

For example, with reference to FIGS. 2-4, the control system 120 may receive the altitude data, including the altitudes $A_0$, $A_1$, and $A_2$, and corresponding times, along the planned flight path 205 shown in FIG. 2. The control system 120 may also receive the speed data, including the speeds $S_0$, $S_1$, and $S_2$, and corresponding times, along the planned flight path 205. The control system 120 may also receive environment data, such as a barometric pressure, for locations along the planned flight path 205. The control system 120 then generates the transition location W, transition time T, and transition amount, such as a change in altitude $\Delta A$ and/or a change in speed $\Delta S$. In FIGS. 2-4, for example, the control system 120 may generate transition location $W_1$ at transition time $T_1$, including a change in altitude $\Delta A_1$ and a change in speed $\Delta S_1$. This transition reflects a climb, including an acceleration. The control system 120 may also generate transition location $W_2$ at transition time $T_2$, including a change in altitude $\Delta A_2$ and a change in speed $\Delta S_2$. This transition also reflects a climb, including an acceleration. In addition, the control system 120 may generate transition location $W_3$ at transition time $T_3$, including a change in altitude $\Delta A_3$ and a change in speed $\Delta S_3$. This transition reflects a descent and a deceleration. The control system 120 may, for example, determine one or more boom values for each transition, and, if the determined boom values are permissible, output the generated transition locations, transition times, and transition amounts to the display and/or use these values in controlling the vehicle 105 as it progresses along the flight path 205.

If, however, the determined boom values are not permissible, for example, for transitions corresponding to transition locations $w_1$ and $w_3$, the control system 120 may determine adjusted locations $W_{1'}$ and $W_{3'}$, adjusted times $T_{1'}$ and $T_{3'}$, and adjusted transition amounts $\Delta A_{1'}$, $\Delta S_{1'}$, $\Delta A_{3'}$, and $\Delta S_{3'}$, as shown in FIGS. 2 and 3. Although adjusted transition locations, transition times, and transition amounts are described in this example, the control system 120 may only determine one or two of these adjusted values. The adjusted transition locations, transition times, and transition amounts are incorporated into the planned flight path 205 to yield an updated planned flight path 205', shown in FIGS. 2 and 3. In the example shown in FIGS. 2 and 3, the adjusted transition locations $W_{1'}$ and $W_{3'}$ are locations before the original transition locations $W_1$ and $W_3$, respectively, and the adjusted transition times $T_{1'}$ and $T_{3'}$ are times before the original transition times $T_1$ and $T_3$, respectively. The changes in altitude $\Delta A_{1'}$ and $\Delta A_{3'}$ in this example are the same changes in altitude as the original changes in altitude $\Delta A_1$ and $\Delta A_3$, respectively. The changes in speed $\Delta S_{1'}$ and $\Delta S_{3'}$ are less than the original changes in speed $\Delta S_1$ and $\Delta S_3$, respectively. That is, the control system 120 determines adjusted transition amounts in terms of changes in speed, for the vehicle 105 to perform the transition. The control system 120 then obtains speed, altitude, and barometric pressure for the adjusted transition location, the adjusted transition time, and the adjusted transition amount. The control system 120 then uses these values to determine one or more boom values for the adjusted location, the adjusted transition time, and the adjusted transition amount. In particular, the control system 120 determines the adjusted boom values 220 shown in FIG. 4. That is, the control system 120 determines boom values that are less than permissible threshold boom values 215 for the adjusted transition locations, to ensure the vehicle 105 does not generate a boom for which the boom value exceeds permissible thresholds in performing transitions of the flight plan 200. Then, as noted above, the adjusted location, adjusted time, and adjusted amount for the transitions are used to update the planned flight path 205, in generating an updated flight path 205'.

The processes 500 and 600 described above may be performed continually, periodically, or upon receiving a request from an operator of the vehicle 105, for example. And the processes 500 and 600 may be performed more than once for the same transition, for several transitions, or for transitions further along the planned flight path 205, as the vehicle 105 progresses along the planned flight path 205. The processes 500 and 600 may also be performed based on a distance remaining to arrival at the destination, for example, 50 miles from an airport, to confirm that transitions for a descent, approach, and landing do not generate boom values that exceed permissible threshold boom values. Further, the processes 500 and 600 may further determine a transition location, a transition time, and a transition amount for one or more transitions based on a required time of arrival of the vehicle at the end of the planned flight path 205.

Figure 7:
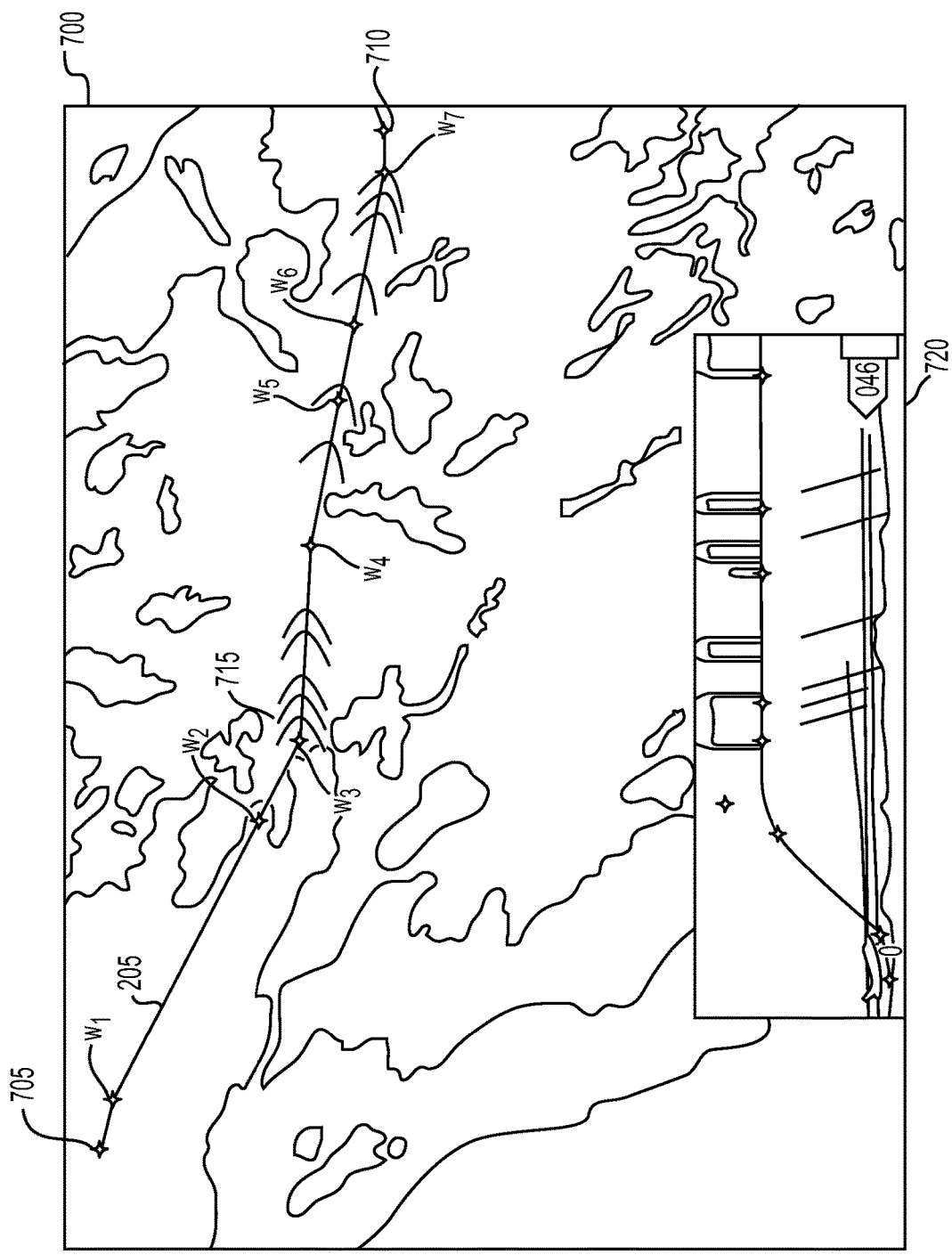
FIG. 7 depicts an example display of a planned flight path and generated transition locations, as viewed by an operator of a vehicle, according to one or more embodiments.

FIG. 7 depicts an example display of the planned flight path 205, as viewed by an operator of the vehicle 105, according to one or more embodiments. In particular, FIG. 7 shows a map 700 of the planned flight path 205, including a starting location 705 and an end location 710, with a number of waypoints w ($w_1$ to $w_7$) therebetween. Carets (or chevrons) 715 along the planned flight path 205 indicate locations at which the vehicle 105 is to accelerate or decelerate, for example, according to the flight plan 200. As the vehicle 105 progresses along the planned flight path 205, and as transition locations are generated or adjusted, the locations of the carets may change. FIG. 7 also includes an inset altitude graphic 720 at a bottom portion of the example display, as viewed by the operator of the vehicle 105. The altitude graphic 720 shows altitudes along the planned flight path 205, as well as boom values determined for a number of the waypoints w along the planned flight path 205. The altitude graphic 720 may also include permissible threshold boom values for the waypoints w along the planned flight path 205, so that the operator of the vehicle 105 can confirm that boom values for the waypoints w are permissible.

FIG. 8 depicts another example display as viewed by an operator of a vehicle, according to one or more embodiments. More specifically, FIG. 8 shows a display 800, including a projected forward view 805 of the flight path of the vehicle 105, and an airspeed tape 810 and an altitude tape 815 along the sides of the projected forward view 805. The airspeed tape 810 shows a current speed of the vehicle 105, based on inputs from a speed sensor, and the altitude tape 815 shows a current altitude of the vehicle 105, based on inputs from an altitude sensor of the vehicle 105. The airspeed tape 810 also includes a speed transition indicator 820, which indicates a change in speed as part of a transition, here, a decrease in speed as part of a deceleration, as determined in the method 500 or the method 600, described above. The altitude tape 815 includes an altitude transition indicator 825, which indicates a change in altitude as part of a transition, here, a descent, as determined in the method 500 or the method 600, described above. The display 800 may also include an indicator of a time remaining for the vehicle 105 to adjust the speed and/or the altitude to perform the transition. Alternatively or in addition, the display 800 may include an indicator of a lateral distance between a current position of the vehicle 105 and the transition location, at which the transition will occur, in order to reduce a boom value to fall within a permissible threshold value.

Figure 9:
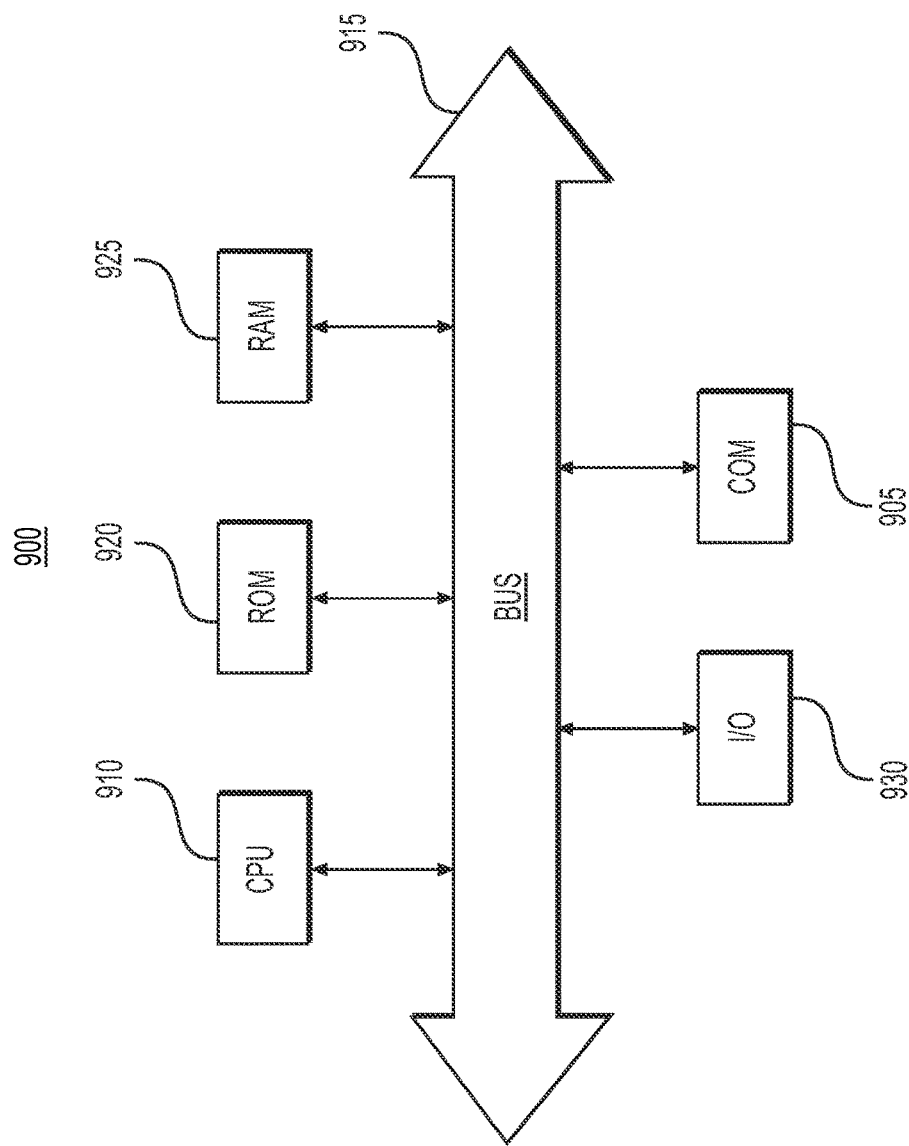
FIG. 9 depicts an example system that may execute techniques presented herein.

FIG. 9 depicts an example system 900, such as the control system 120, that may execute the methods and methods presented herein. FIG. 9 is a simplified functional block diagram of a computer that may be configured to execute techniques described herein, according to exemplary embodiments of the present disclosure. Specifically, the computer (or "platform" as it may not be a single physical computer infrastructure) may include a data communication interface 905 for packet data communication. The platform may also include a central processing unit ("CPU") 910, in the form of one or more processors, for executing program instructions. The platform may include an internal communication bus 915, and the platform may also include a program storage and/or a data storage for various data files to be processed and/or communicated by the platform, such as a read only memory (ROM) 920 and a random access memory (RAM) 925, although the system 900 may receive programming and data via network communications. The system 900 also may include input and output (I/O) ports 930 to connect with input and output devices, such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating and displaying a location, a time, and an amount of one or more transitions along a flight path of a vehicle, the method comprising:
   receiving speed data, altitude data, and flight path data, including environment data, for a flight path of the vehicle;
   generating, for each of one or more transitions along the flight path of the vehicle, at least one of a transition location, of upcoming locations along the flight path, a transition time, and a transition amount, based on:
   the received speed data, altitude data, and flight path data,
   a barometric pressure for each of the one or more transitions, one or more boom values for each of the one or more transitions based on the barometric pressure for each of the one or more transitions, and a permissible threshold boom value associated with each of the upcoming locations along the flight path;

outputting the generated transition location, transition time, and transition amount for the one or more transitions to a display system; and controlling the vehicle through at least one of the one or more transitions.

2. The method of claim 1, further comprising generating, on a display of the display system, a transition location indicator for the transition location for each of the one or more transitions on a graphic showing the flight path.

3. The method of claim 1, further comprising generating, on a display of the display system, a transition amount indicator indicating the transition amount for each of the one or more transitions, the transition amount indicator being generated alongside at least one of a speed graphic showing a current speed of the vehicle and an altitude graphic showing a current altitude of the vehicle.

4. The method of claim 1, wherein the environment data includes at least a barometric pressure at each of the upcoming locations along the flight path, and wherein the generating the at least one of the transition location, transition time, and transition amount for each of the one or more transitions includes:

determining a speed and an altitude of the vehicle, and the barometric pressure for each of the one or more transitions;

determining the one or more boom values for each of the one or more transitions, based on the determined speed, altitude, and barometric pressure; and determining whether each boom value, of the one or more boom values, is permissible based on the permissible threshold boom value, wherein the at least one of the transition location, transition time, and transition amount is output if the one or more boom values are permissible.

5. The method of claim 4, wherein the generating the at least one of the transition location, transition time, and transition amount for each of the one or more transitions further includes:

in response to determining that a boom value, of the one or more determined boom values, is not permissible, generating at least one of an adjusted transition location, an adjusted transition time, and an adjusted transition amount for a corresponding transition of the one or more transitions;

determining a speed and an altitude of the vehicle, and the barometric pressure for the adjusted transition location, adjusted transition time, and adjusted transition amount;

determining one or more boom values for the adjusted transition location, adjusted transition time, and adjusted transition amount, based on the speed, altitude, and barometric pressure determined for the adjusted transition location, adjusted transition time, and adjusted transition amount; and determining whether a boom value, of the one or more boom values for the adjusted transition location, adjusted transition time, and adjusted transition amount, is permissible based on the corresponding permissible threshold boom value, wherein the adjusted transition location, adjusted transition time, and adjusted transition amount is output to the display of the display system.

6. The method of claim 1, wherein the one or more transitions include one or more of acceleration, deceleration, climb, and descend transitions of the vehicle.

7. The method of claim 1, wherein the generating the at least one of the transition location, transition time, and transition amount for each of the one or more transitions is further based on a required time of arrival of the vehicle at an end of the flight path.

8. A system for generating and displaying a location, a time, and an amount of one or more transitions along a flight path of a vehicle, the system comprising:

a memory storing instructions; and a processor executing the instructions to perform a method including:

receiving speed data, altitude data, and flight path data, including environment data, for a flight path of the vehicle;

generating, for each of one or more transitions along the flight path of the vehicle, at least one of a transition location, of upcoming locations along the flight path, a transition time, and a transition amount, based on:

the received speed data, altitude data, and flight path data, a barometric pressure for each of the one or more transitions, one or more boom values for each of the one or more transitions based on the barometric pressure for each of the one or more transitions, and a permissible threshold boom value associated with each of the upcoming locations along the flight path;

outputting the generated transition location, transition time, and transition amount for the one or more transitions to a display system; and controlling the vehicle through at least one of the one or more transitions.

9. The system of claim 8, wherein the method further includes generating, on a display of the display system, a transition location indicator for the transition location for the one or more transitions on a graphic showing the flight path.

10. The system of claim 8, wherein the method further includes generating, on a display of the display system, a transition amount indicator, indicating the transition amount for the one or more transitions amounts, the transition amount indicator being generated alongside at least one of a speed graphic showing a current speed of the vehicle, and an altitude graphic showing a current altitude of the vehicle.

11. The system of claim 8, wherein the environment data includes at least a barometric pressure at each of the upcoming locations along the flight path, and wherein the generating the at least one of the transition location, transition time, and transition amount for each of the one or more transitions includes:

determining a speed and an altitude of the vehicle, and the barometric pressure for each of the one or more transitions;

determining the one or more boom values each of the one or more transitions, based on the determined speed, altitude, and barometric pressure; and determining whether each boom value, of the one or more boom values, is permissible based on the permissible threshold boom value, wherein the at least one of the transition location, the transition time, and the transition amount are output if the one or more boom values are permissible.

12. The system of claim 11, wherein the generating the at least one of the transition location, transition time, and transition amount for each of the one or more transitions further includes:
  in response to determining that a boom value, of the one or more determined boom values, is not permissible, generating at least one of an adjusted transition location, an adjusted transition time, and an adjusted transition amount for a corresponding transition of the one or more transitions;
  determining a speed and an altitude of the vehicle, and the barometric pressure for the adjusted transition location, adjusted transition time, and adjusted transition amount;
  determining one or more boom values for the adjusted transition location, adjusted transition time, and adjusted transition amount, based on the speed, the altitude, and the barometric pressure; and
  determining whether a boom value, of the one or more boom values for the adjusted transition location, adjusted transition time, and adjusted transition amount, is permissible based on the corresponding permissible threshold boom value,
  wherein the adjusted transition location, adjusted transition time, and adjusted transition amount are output to the display of the display system.

13. The system of claim 8, wherein the one or more transitions include one or more of acceleration, deceleration, climb, and descend transitions of the vehicle.

14. The system of claim 8, wherein the generating the transition location, the transition time, and the transition amount for the one or more transitions is further based on a required time of arrival of the vehicle at an end of the flight path.

15. A non-transitory computer-readable medium storing instructions that, when executed by a processor, cause the processor to perform a method of generating and displaying a location, a time, and an amount of one or more transitions along a flight path of a vehicle, the method comprising:
  receiving speed data, altitude data, and flight path data, including environment data, for a flight path of the vehicle;
  generating, for each of one or more transitions along the flight path of the vehicle, at least one of a transition location, of upcoming locations along the flight path, a transition time, and a transition amount, based on:
    the received speed data, altitude data, and flight path data,
    a barometric pressure for each of the one or more transitions,
    one or more boom values for each of the one or more transitions based on the barometric pressure for each of the one or more transitions, and
    a permissible threshold boom value associated with each of the upcoming locations along the flight path;
  outputting the generated transition location, transition time, and transition amount for the one or more transitions to a display system; and
  controlling the vehicle through at least one of the one or more transitions.

16. The computer-readable medium of claim 15, wherein the method further comprises generating, on a display of the display system, a transition location indicator for the transition location for the one or more transitions on a graphic showing the flight path.

17. The computer-readable medium of claim 15, wherein the method further comprises generating, on a display of the display system, a transition amount indicator, indicating the transition amount for the one or more transitions amounts, the transition amount indicator being generated alongside at least one of a speed graphic showing a current speed of the vehicle, and an altitude graphic showing a current altitude of the vehicle.

18. The computer-readable medium of claim 15, wherein the environment data includes at least a barometric pressure at each of the upcoming locations along the flight path, and
  wherein the generating the transition location, transition time, and transition amount for each of the one or more transitions includes:
    determining a speed and an altitude of the vehicle, and the barometric pressure for each of the one or more transitions;
    determining the one or more boom values each of the one or more transitions, based on the determined speed, altitude, and barometric pressure; and
    determining whether each boom value, of the one or more boom values, is permissible based on the permissible threshold boom value,
    wherein the transition location, the transition time, and the transition amount are output if the one or more boom values are permissible.

19. The computer-readable medium of claim 18, wherein the generating the transition location, transition time, and transition amount for each of the one or more transitions further includes:
  in response to determining that a boom value, of the one or more determined boom values, is not permissible, generating at least one of an adjusted transition location, an adjusted transition time, and an adjusted transition amount for a corresponding transition of the one or more transitions;
  determining a speed and an altitude of the vehicle, and the barometric pressure for the adjusted transition location, adjusted transition time, and adjusted transition amount;
  determining one or more boom values for the adjusted transition location, the adjusted transition time, and the adjusted transition amount, based on the speed, the altitude, and the barometric pressure; and
  determining whether a boom value, of the one or more boom values for the adjusted transition location, adjusted transition time, and adjusted transition amount, is permissible based on the corresponding permissible threshold boom value,
  wherein the adjusted transition location, adjusted transition time, and adjusted transition amount are output to the display of the display system.

20. The computer-readable medium of claim 18, wherein the generating the transition location, the transition time, and the transition amount for the one or more transitions is further based on a required time of arrival of the vehicle at an end of the flight path.

* * * * *